US012691925B2

(12) United States Patent
Annequin-Digond et al.

(10) Patent No.: US 12,691,925 B2
(45) Date of Patent: Jul. 28, 2026

(54) STEERING SYSTEM FOR MOTOR VEHICLE AND MOTOR VEHICLE COMPRISING THE SAME

(71) Applicant: FERRARI S.P.A., Modena (IT)

(72) Inventors: Thierry Annequin-Digond, Modena (IT); Thomas Granjard, Modena (IT)

(73) Assignee: FERRARI S.P.A. (IT)

( * ) Notice: Subject to any disclaimer, the term of this patent is extended or adjusted under 35 U.S.C. 154(b) by 0 days.

(21) Appl. No.: 19/055,641

(22) Filed: Feb. 18, 2025

(65) Prior Publication Data

US 2025/0276731 A1 Sep. 4, 2025

(30) Foreign Application Priority Data

Mar. 1, 2024 (IT) ........................ 102024000004546

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC ............................... B62D 5/006; B62D 5/001
See application file for complete search history.

(56) References Cited

U.S. PATENT DOCUMENTS

| | | | |
|---|---|---|---|
| 6,711,965 B2 | 3/2004 | Tomaru et al. | |
| 10,421,476 B2 * | 9/2019 | Rouleau .................. | B62D 1/184 |

| | | | |
|---|---|---|---|
| 10,577,010 B2 * | 3/2020 | Derocher ............... | B62D 1/183 |
| 10,611,395 B2 | 4/2020 | Huber | |
| 11,345,387 B2 * | 5/2022 | Kurokawa ............. | B62D 1/181 |
| 11,440,577 B2 * | 9/2022 | Edamoto ................ | B62D 1/183 |
| 11,697,449 B2 * | 7/2023 | Ryne ...................... | B60K 35/60 74/484 R |
| 2002/0079686 A1 | 6/2002 | Kondou et al. | |

(Continued)

FOREIGN PATENT DOCUMENTS

| | | | | | |
|---|---|---|---|---|---|
| CN | 109455219 B | * | 9/2020 | ........... | B62D 5/0469 |
| CN | 112644580 A | * | 4/2021 | ............. | B62D 1/192 |

(Continued)

OTHER PUBLICATIONS

Italian Search Report and Written Opinion, Italian Patent Application 202400004546, Completion Date Sep. 19, 2024, 8 pp.

*Primary Examiner* — Nicole T Verley
(74) *Attorney, Agent, or Firm* — The Belles Group, P.C.

(57) ABSTRACT

A steering system for a motor vehicle comprising a steering wheel capable of rotating about a first rotational axis, a sensory system adapted to detect a physical quantity associated with the angular position of the steering wheel about the first rotational axis, actuator devices adapted to rotate one or more wheels of the motor vehicle about respective steering axes, and an electronic control unit operatively connected to the sensory system and to the actuator devices is disclosed. The steering system further comprises a frame operatively connected to the motor vehicle, a body supported by the frame and capable of sliding with respect thereto parallel to the first rotational axis, and a steering shaft to which the steering wheel is fixed and which is supported by the body. The frame can rotate with respect to the motor vehicle about a second rotational axis which is transverse to the first rotational axis.

12 Claims, 7 Drawing Sheets

(56)　　　　　References Cited

U.S. PATENT DOCUMENTS

| | | | | |
|---|---|---|---|---|
| 2015/0232117 A1* | 8/2015 | Stinebring | ............ | B62D 1/181 |
| | | | | 74/493 |
| 2018/0319419 A1 | 11/2018 | Kreutz et al. | | |
| 2019/0210633 A1* | 7/2019 | Derocher | .............. | B62D 1/181 |
| 2019/0283796 A1* | 9/2019 | Rawlings | ................... | F16H 1/16 |
| 2020/0198689 A1* | 6/2020 | Ashida | ................... | B62D 5/001 |
| 2021/0129891 A1* | 5/2021 | Ryne | ...................... | B62D 1/185 |
| 2021/0213997 A1* | 7/2021 | Watanabe | ................ | G05D 3/20 |
| 2022/0379951 A1* | 12/2022 | Ficca | .................... | B62D 5/006 |
| 2023/0235778 A1 | 7/2023 | Song | | |
| 2024/0294205 A1* | 9/2024 | Conigliaro | ................ | B60T 7/06 |
| 2025/0326428 A1* | 10/2025 | Ein Waldt | ........... | B62D 5/0478 |

FOREIGN PATENT DOCUMENTS

| | | | | | |
|---|---|---|---|---|---|
| CN | 116062021 A | * | 5/2023 | ............ | B62D 5/001 |
| CN | 117141568 A | * | 12/2023 | ............ | B62D 1/181 |
| CN | 118163853 A | * | 6/2024 | ............ | B62D 1/187 |
| CN | 113562061 B | * | 8/2025 | .............. | B62D 1/10 |
| DE | 19962494 A1 | * | 7/2000 | ............ | B62D 1/181 |
| DE | 102018101528 A1 | * | 7/2019 | ............ | B62D 5/006 |
| DE | 102019108014 A1 | * | 10/2019 | ............ | B62D 1/192 |
| DE | 102018212696 B3 | * | 11/2019 | ........ | F16H 25/2056 |
| DE | 102020206399 A1 | * | 11/2021 | ........... | B62D 5/0442 |
| DE | 102021108609 A1 | * | 10/2022 | ............ | B62D 1/181 |
| DE | 102023208100 A1 | * | 2/2025 | ............ | B62D 5/006 |
| EP | 0463501 A1 | * | 1/1992 | ............ | B62D 1/195 |
| EP | 1053927 A1 | * | 11/2000 | .............. | B62D 5/04 |
| JP | 2001199350 A | * | 7/2001 | ............ | B62D 5/0409 |
| JP | 4325403 B2 | * | 9/2009 | ............ | B62D 1/185 |
| JP | 2016060423 A | | 4/2016 | | |
| JP | WO2020240763 A1 | * | 9/2021 | ............ | B62D 1/181 |
| JP | WO2020240764 A1 | * | 9/2021 | ............ | B62D 1/181 |
| JP | 2023104296 A | * | 7/2023 | | |
| WO | WO-2020152188 A1 | * | 7/2020 | ............ | B62D 5/006 |
| WO | WO-2020213546 A1 | * | 10/2020 | ............ | B62D 1/189 |
| WO | WO-2022045346 A1 | * | 3/2022 | ............ | B62D 1/187 |

* cited by examiner

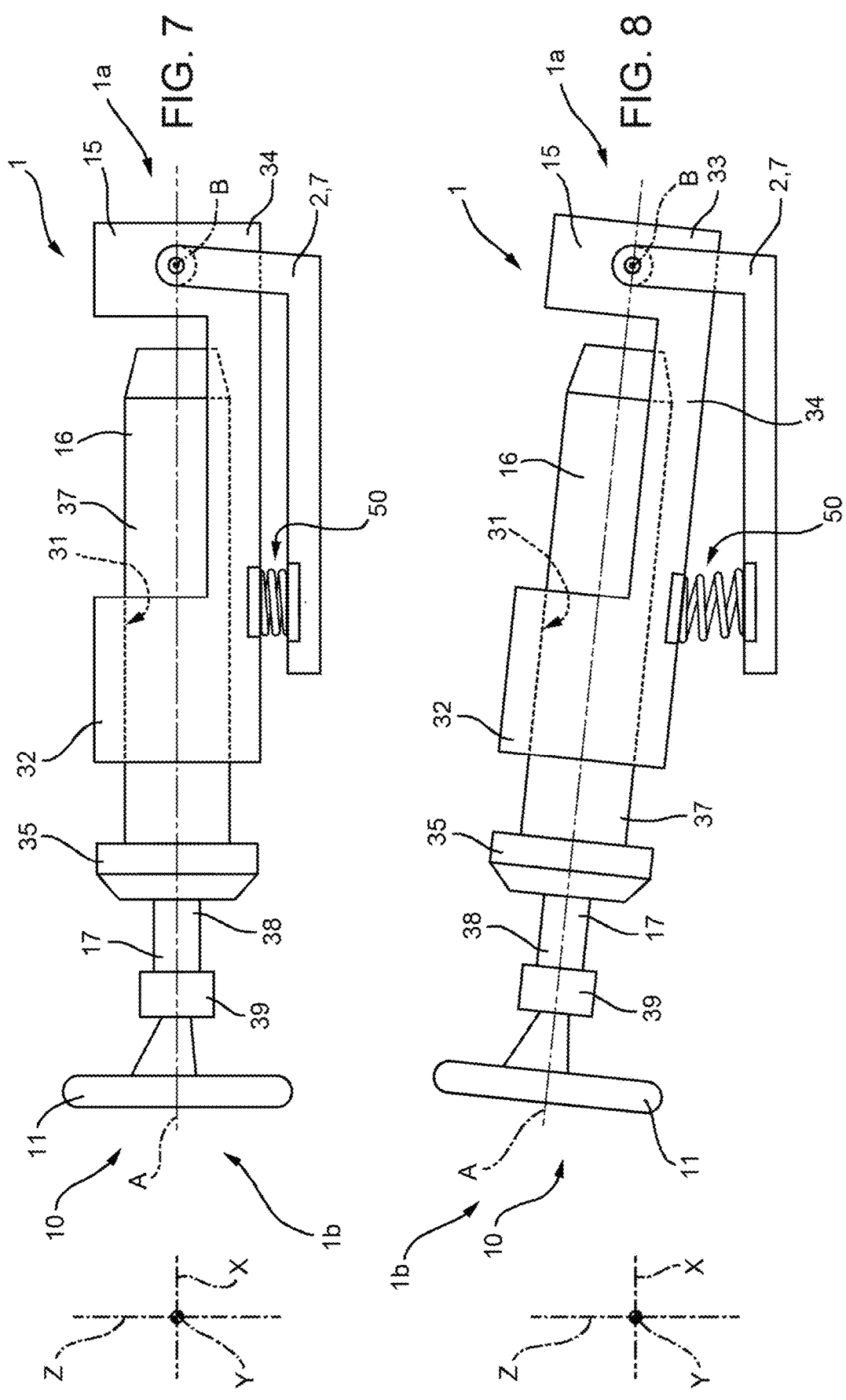

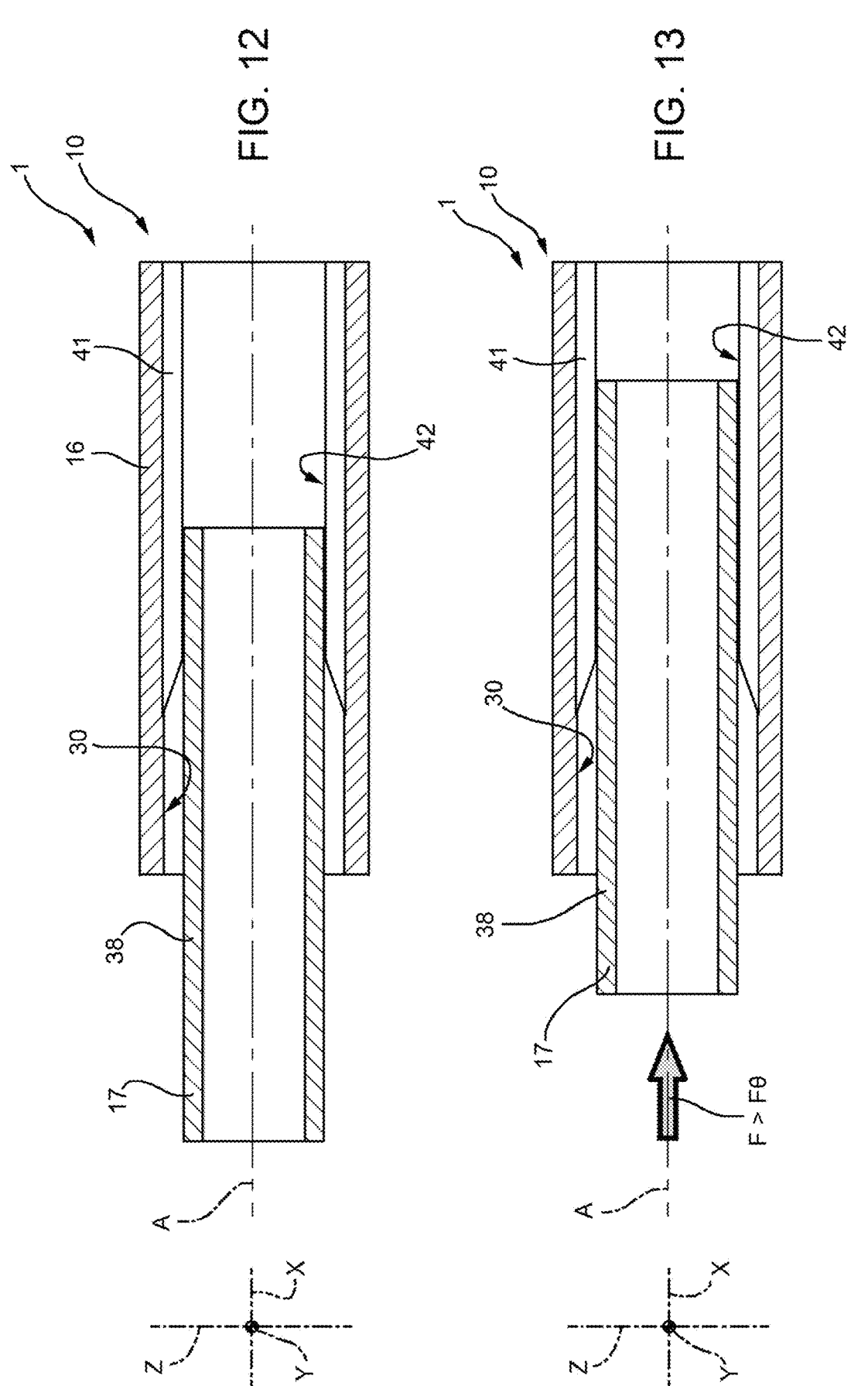

1

STEERING SYSTEM FOR MOTOR VEHICLE AND MOTOR VEHICLE COMPRISING THE SAME

CROSS-REFERENCE TO RELATED APPLICATION

This patent application claims priority from Italian patent application no. 102024000004546 filed on Mar. 1, 2024, the entire disclosure of which is incorporated herein by reference.

TECHNICAL FIELD

The invention relates to an improved steering system for a motor vehicle, in particular of the steer-by-wire type. The invention also relates to a motor vehicle comprising an improved steering system.

BACKGROUND

Motor vehicles are known which comprise a frame and a plurality of wheels, each capable of rotating with respect to the frame around a respective rotation axis so as to determine the movement of the motor vehicle with respect to the ground. Each wheel can also rotate with respect to the frame about a respective steering axis oriented transversely to the rotation axis, so as to determine the steering of the vehicle. In addition, motor vehicles can be associated with an integral reference system comprising:

a longitudinal extension axis X;
an axis Z oriented vertically to the ground, on which the wheels rest, and orthogonally to the axis X; and
a Y axis oriented orthogonally to the axes X and Z.

Known motor vehicles further comprise a steering system adapted to allow the wheels to rotate around the respective steering axes. In particular, known steering systems include steer-by-wire steering systems, which essentially comprise:

a steering wheel, which rotates around a rotation axis of its and can be used by the driver to control the steering of the vehicle;
a sensory system adapted to detect the angular position of the steering wheel with respect to its rotation axis;
one or more actuators adapted to rotate the wheels around the respective steering axes; and
an electronic control unit operatively connected to the sensory system and to the actuators.

The electronic control unit is configured to cause the actuators to rotate the wheels around the respective steering axes based on the angular position of the steering wheel detected by the sensory system. In other words, in steer-by-wire steering systems, the steering wheel is not mechanically connected to the wheels and the steering is controlled electronically.

In order to allow drivers with anthropometric parameters that can be very different from one another to use the steering system of the vehicle, the position of the steering wheel should be adjustable with respect to the driver's seat. In detail, the steering wheel should be movable with respect to the driver's seat both parallel to the axis X and parallel to the axis Z. In addition, at least in some countries, local approval requirements require the steering wheel to be able to automatically move away from the driver in the event of a collision of the vehicle with an obstacle. It has been observed that known steer-by-wire steering systems do not allow for adjustments of this type or include adjustment devices that leave room for improvements.

In the light of the above, there is a need for a steer-by-wire steering system that effectively and ergonomically adapts to the needs of the driver. An object of the invention is to fulfil the need discussed above, preferably in a simple and cost-effective fashion.

DESCRIPTION OF THE INVENTION

In one form, the invention can be a steering system for a motor vehicle, said steering system comprising a steering wheel rotatable about a first rotational axis, a sensory system adapted to detect a physical quantity associated with the angular position of said steering wheel about said first rotational axis, at least one actuator device adapted to rotate one or more wheels of said motor vehicle about respective steering axes, an electronic control unit operatively connected to said sensory system and said at least one actuator device, said electronic control unit being configured to command, in use, said at least one actuator device to rotate said wheels about the respective said steering axes on the basis of an informative datum associated with said physical quantity and received, in use, by said sensory system, a frame operatively connected to a portion of said motor vehicle, wherein said frame is rotatable with respect to said portion about a second rotational axis, which is transversal to said first rotational axis, a body supported by said frame and slidable with respect thereto parallel to said first rotational axis, and a steering shaft to which said steering wheel is fixed and which is supported by said body, wherein said body comprises a tubular cavity arranged coaxially to said first rotational axis and said steering shaft engages said tubular cavity, said steering shaft being integral with said body along said first rotational axis when the component of a force acting, in use, on said steering wheel parallel to said first rotational axis is less than a threshold value, said steering shaft being slidable with respect to said body along said first rotational axis when the component of said force acting, in use, on said steering wheel parallel to said first rotational axis is greater than said threshold value.

In one form, the invention can be a motor vehicle comprising the steering system of the preceding paragraph.

In one form, the invention can be a steering system for a motor vehicle, said steering system comprising a steering wheel rotatable about a steering wheel axis, a sensor system adapted to detect a physical quantity associated with the angular position of said steering wheel about said steering wheel axis, an actuator device adapted to rotate a wheel of said motor vehicle about a steering axis, an electronic control unit operatively connected to said sensor system and said actuator device, said electronic control unit being configured to command said actuator device to rotate said wheel about said steering axis on the basis of an informative datum associated with said physical quantity and received by said sensor system, a frame operatively connected to said motor vehicle, wherein said frame is rotatable about a second axis which is transverse to said steering wheel axis, a body supported by said frame, and a steering shaft to which said steering wheel is fixed, wherein said steering shaft is rigidly supported by said body along said steering wheel axis when the component of a force acting on said steering wheel along said steering wheel axis is less than a threshold value, and wherein said steering shaft is collapsible with respect to said body along said steering wheel axis when the component of said force acting on said steering wheel along said steering wheel axis is greater than said threshold value.

In one form, the invention can be a motor vehicle comprising the steering system of the preceding paragraph.

BRIEF DESCRIPTION OF THE DRAWINGS

Hereinafter, an embodiment of the invention is be described, in order to allow the latter to be better understood, by way of non-limiting example and with reference to the accompanying drawings, wherein:

FIGS. 7 and 8 are schematic side views of the steering system shown in FIGS. 1 and 2 in respective different height adjustment positions, with parts left out for greater clarity;

FIGS. 12 and 13 are sectional views, on a larger scale, of two components of the steering system, in the step shown in FIG. 10 and in the step shown in FIG. 11, respectively, and with parts left out for greater clarity.

DETAILED DESCRIPTION OF THE INVENTION

Figures 1, 2:
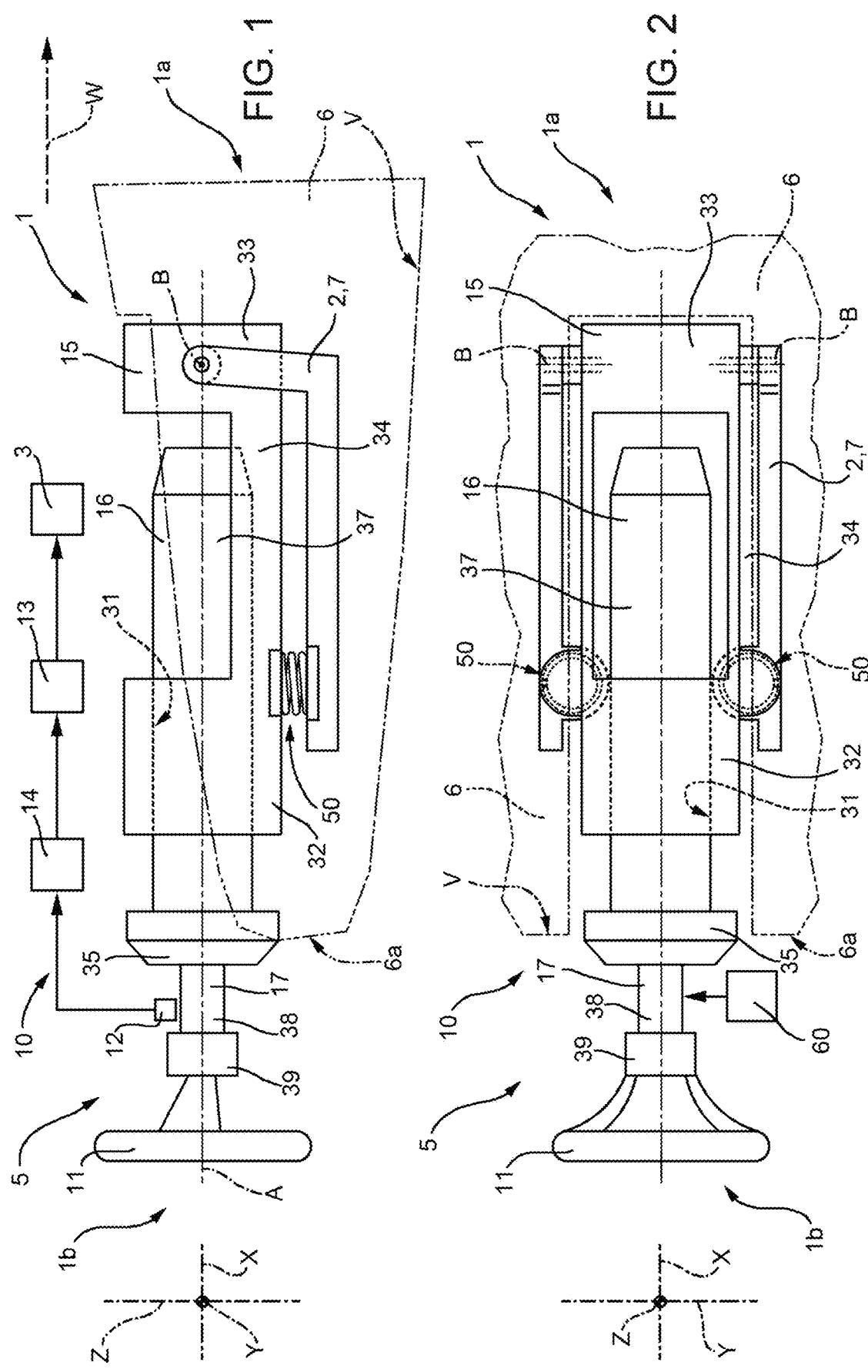
FIG. 1 is a schematic side view of a portion of a motor vehicle according to the invention comprising a steering system, with parts left out for greater clarity.
FIG. 2 is a top view of the portion shown in FIG. 1 and with parts left out for greater clarity.

In FIG. 1, reference number 1 is used to indicate, as a whole, a motor vehicle comprising:

a frame 2;

a plurality of wheels 3—only one of them being shown in a schematic manner—capable of rotating relative to the frame 2 around respective rotational axes so as to allow the motor vehicle 1 to move relative to a fixed reference system and capable of being steered relative to the frame 2 around respective steering axes; and a steering system 10, which is adapted to enable and/or cause the rotation of at least some of the wheels 3 around the respective steering axes.

The motor vehicle 1 further defines:

a longitudinal extension direction X;

a direction Z, which is orthogonal to the direction X and is oriented vertically to the ground, on which the wheels 3 rest; and a direction Y, which is orthogonal to the direction X and to the direction Z.

The motor vehicle 1 also comprises a front end 1a and a rear end 1b of the motor vehicle 1 with reference to an advancement direction W of the motor vehicle 1 (FIG. 1).

The frame 2 defines, in turn, a cabin 5 for accommodating a driver and possible passengers and comprises a dashboard 6, which is located in the cabin 5. In addition, the frame 2 comprises a crossbeam 7 (also called "dashboard crossbeam" in the automotive industry), which extends parallel to or substantially parallel to the direction Y and supports the dashboard 6.

The dashboard 6 comprises, in turn, a surface 6a facing the cabin 5 and a volume V interposed between the surface 6a and the front end 1a parallel to the direction Z.

The steering system 10 preferably comprises (FIG. 1):

a steering wheel 11 capable of rotating around an axis A;

a sensory system 12 adapted to detect a physical quantity associated with the angular position of the steering wheel 11 around the axis A;

actuator devices 13 adapted to rotate one or more wheels 3 around the respective steering axes relative to the frame 2; and an electronic control unit 14 operatively connected to the sensory system 12 and to the actuator devices 13.

The electronic control unit 14 is configured to cause, in use, the actuator devices 13 to rotate the wheels 3 around the respective steering axes based on an informative data item associated with the physical quantity detected by the sensory system 12.

In detail, the axis A lies in a plane parallel to the directions X and Z.

By way of example, the detected physical quantity is the angle of rotation of the steering wheel 11 around the axis A relative to a reference system integral to the frame 2 and the sensory system 12 comprises one or more encoders. The actuator devices 13 comprise, for example, electromechanical actuators.

The steering wheel 11 is mechanically separate and/or uncoupled from the wheels 3. In particular, the steering system 10 is of the steer-by-wire type.

Advantageously, the steering system 10 further comprises:

a frame 15 operatively connected to the frame 2;

a body 16 supported by the frame 15 and capable of sliding with respect thereto parallel to the axis A; and a steering shaft 17, to which the steering wheel 11 is fixed and which is supported by the body 16 in a rotary manner;

the frame 15 is can rotate with respect to the frame 2 around a rotational axis B transverse to the axis A. Preferably, the axis B is oriented orthogonally to the axis A and is parallel to the direction Y.

In detail, the frame 15 is hinged to the crossbeam 7. In addition, the frame 15 is located above the crossbeam 7 with respect to the ground, on which the wheels 3 rest, parallel to the direction Z.

In the embodiment shown herein, the frame 15 comprises a cylindrical opening 31 arranged coaxially to the axis A and engaged by the body 16 in a sliding manner. In detail, the frame 15 comprises:

a portion 32, in area of which the cylindrical opening 31 is located;

a portion 33, which is opposite to the portion 32 parallel to the axis A and in the area of which the frame 15 is hinged to the crossbeam 7; and a portion 34 interposed between the portion 32 and the portion 33 parallel to the axis A.

The portion 32 is closer to the steering wheel 11 than the portion 33. More in detail, the cylindrical opening 31 goes through the portion 32 parallel to the axis A.

In addition, the extension of the portion 34 parallel to the direction Z is smaller than the extension of the portions 32 and 33 parallel to the direction Z. Furthermore, preferably, the extension of the portion 32 parallel to the direction Z is identical to the extension of the portion 33 parallel to the direction Z.

Furthermore, proceeding parallel to the axis A, the body 16 comprises:

a portion 35 facing the steering wheel 11; and a portion 37, preferably with a cylindrical shape.

In detail, the extension of the portion 35 radially with respect to the axis A is greater than the extension of the portion 37 radially with respect to the axis A. Specifically, the extension of the portion 35 radially with respect to the axis A is greater than the diameter of the cylindrical opening 31 in a plane perpendicular to the axis A.

Furthermore, preferably, the extension of the portion 37 radially with respect to the axis A is constant or substantially constant along the axis A.

As shown in the figures, furthermore, the portion 35 is located on the side of the portion 32 facing the steering wheel 11; the portion 37 extends partly on the side of the portion 32 facing the steering wheel 11, partly through the cylindrical opening 31 and partly on the side of the portion 32 facing the portion 34.

In detail, the steering system 10 comprises guides (not shown) adapted to guide the sliding of the body 16 with respect to the frame 15 parallel to the axis A.

The steering shaft 17 comprises:

a cylindrical shaft 38, which cooperates with the body 16; and a portion 39 opposite the cylindrical shaft 38 along the axis A and fixed to the steering wheel 11.

In detail, the extension of the portion 39 radially with respect to the axis A is greater than the extension of the cylindrical shaft 38 radially with respect to the axis A.

The steering shaft 17 can slide with respect to the frame 15, in an integral manner together with the body 16, parallel to the axis A in at least some operating configurations of the steering system 10. In addition, the steering shaft 17 and the body 16 can rotate, in an integral manner together with the frame 15, around the rotational axis B.

Figures 3, 4, 5:
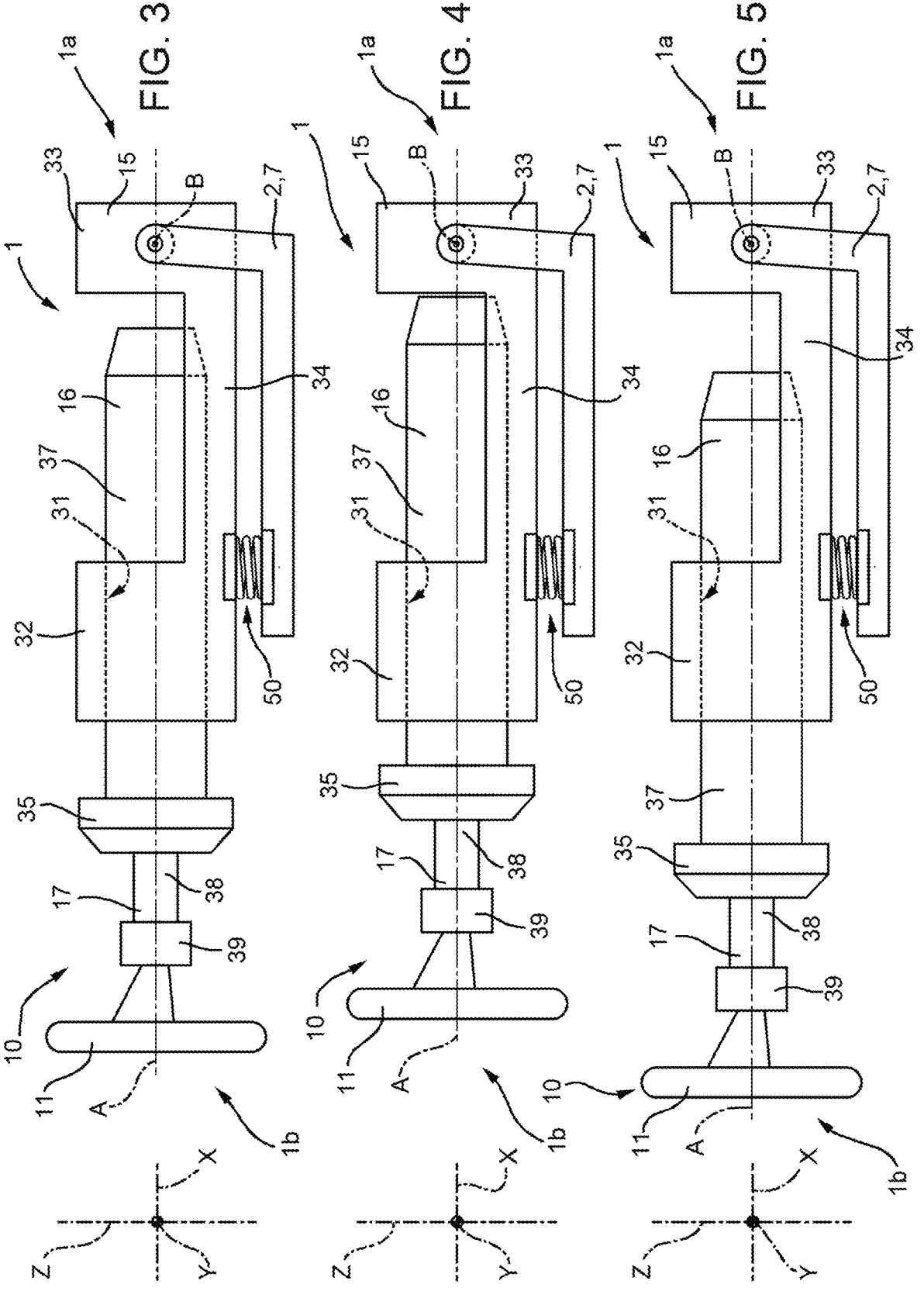
FIGS. 3, 4 and 5 are schematic side views of the steering system shown in FIGS. 1 and 2 in respective different longitudinal adjustment positions and with parts left out for greater clarity.

In the non-limiting embodiment shown herein, the steering shaft 17 can slide with respect to the frame 15 between a retracted position (FIG. 4), in which the distance between the steering wheel 11 and the frame 15 parallel to the axis A is equal to a first value, and an extended position (FIG. 4), in which the distance between the steering wheel 11 and the frame 15 parallel to the axis A is equal to a second value (FIG. 5). In detail, the first value is smaller than the second value. The steering shaft 17 can also be placed, with respect to the frame 15, in a nominal position (FIG. 3), in which the distance between the steering wheel 11 and the frame 15 parallel to the axis A is intermediate between the first value and the second value.

In the non-limiting embodiment shown herein, moreover, the steering shaft 17 can rotate with respect to the frame 2 around the axis B between a lowered position (FIG. 7) and a lifted position (FIG. 8). More in detail, the distance between the steering wheel 11 and the crossbeam 7 parallel to the direction Z is greater when the steering shaft 17 is in the lifted position than when the steering shaft 17 is in the lowered position.

The steering system 10 further comprises two motors 18 (only one of them being shown in FIG. 6) integral to the frame 15 and adapted to cooperate with the body 16. The motors 18 are adapted to determine the sliding of the body 16 with respect to the frame 15 parallel to the axis A.

In detail, the body 16 comprises two endless screws 19 (only one of them being shown in FIG. 6) capable of rotating around respective rotational axes C parallel to the axis A and each motor 18 comprises a gear 20 capable of rotating around a rotational axis D, preferably parallel to the axis B. Each endless screw 19 meshes with a respective gear 20.

More in detail, each endless screw 19 extends in the area of the portion 37. In addition, the body 16 comprises two supports 40, for example two rolling bearings, which each allow a respective endless screw 19 to rotate around respective axes C with respect to the frame 2.

Figure 6:
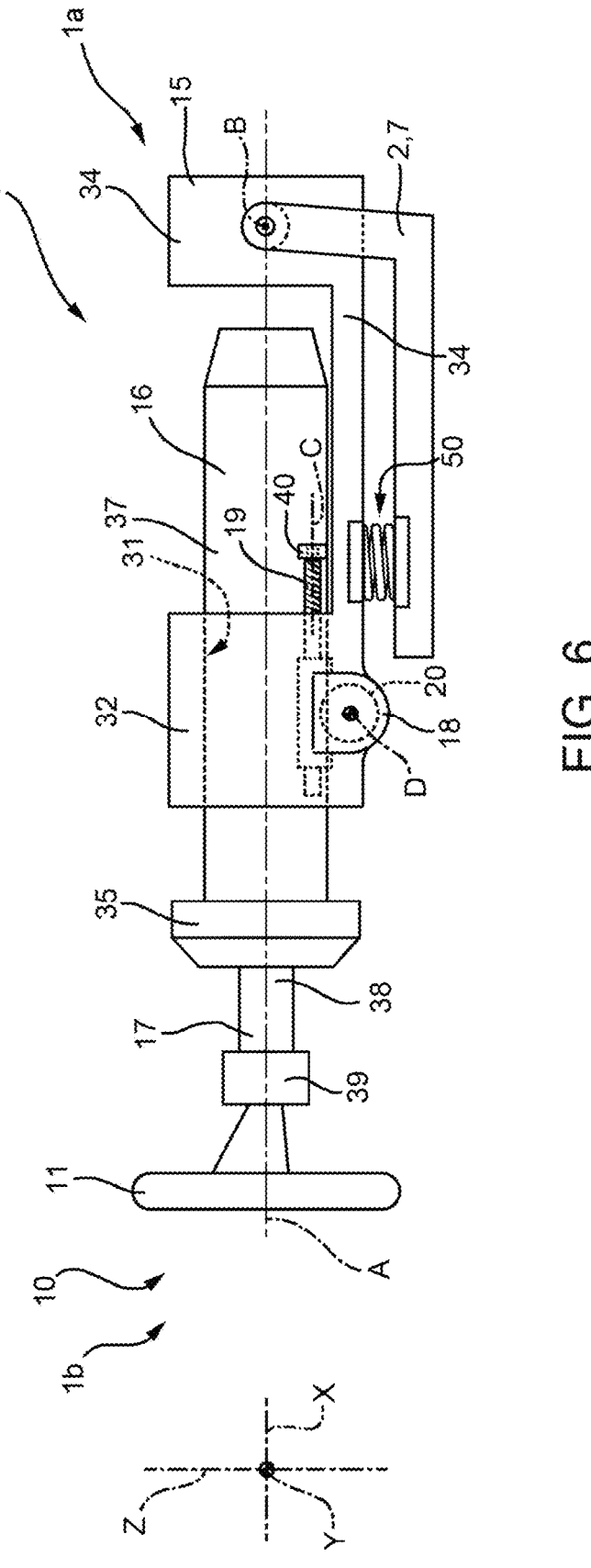
FIG. 6 is a schematic side view of the steering system shown in FIGS. 1 to 5, showing an adjustment device acting along a longitudinal direction and with parts left out for greater clarity.

Each motor 18 extends transversely to the body 16 and preferably in the area of a region of the portion 32 facing the crossbeam 7 (FIG. 6). More in detail, the motors 18 protrude outwards from the portion 32 parallel to the axes D (FIG. 2).

The two motors 18 are opposite one another with respect to the portion 32 parallel to the axes D. Similarly, the two endless screws 19 are opposite one another with respect to the portion 37 parallel to the axes D.

Furthermore, the motors 18 preferably are electric motors.

The steering system 10 further comprises a support device 50 adapted to support the frame 15 with respect to the crossbeam 7. The device 50 is shown in a simplified manner as a spring in FIGS. 1 to 8, 10 and 11.

Figure 9:
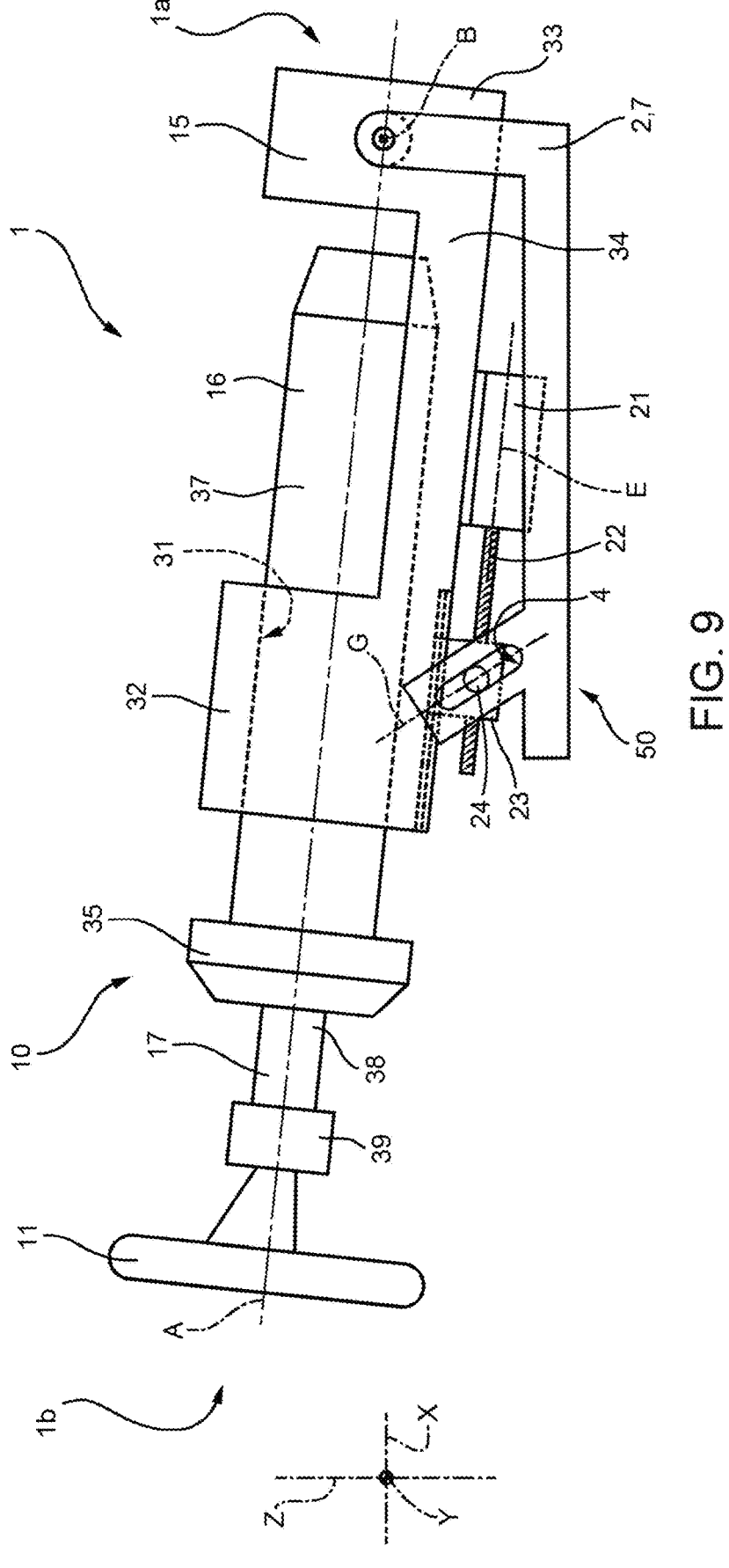
FIG. 9 is a schematic side view of the steering system shown in FIGS. 7 and 8, showing a height adjustment device and with parts left out for greater clarity.

This device 50 is shown more in detail in FIG. 9.

In particular, the steering system 10 comprises a motor 21 integral to the frame 15 and adapted to determine the rotation of the frame 15 with respect to the frame 2 around the axis B.

The motor 21 comprises, in turn:

an endless screw 22 capable of rotating around a rotational axis E parallel to the axis A; and a female screw element 23, which engages the endless screw 22.

The crossbeam 7 also comprises two guides 4 (only one of them being shown in FIG. 9), one of which is adapted to be engaged by the female screw element 23 in a sliding manner.

In detail, each guide 4 comprises a slot-shaped opening and the female screw element 23 comprises a pin 24. The pin 24 engages the opening of one of the two guides 4 in a sliding manner. The frame 15 comprises a further pin—not shown—which is opposite the pin 24 parallel to the axis B and engages the opening of the other one of the two guides 4 in a sliding manner.

More in detail, the guides 4 are linear and extend along respective directions G transverse to the axes A and B. The directions G lie on respective planes parallel to the axis A and to the direction Z. In addition, proceeding parallel to the direction Z in the direction oriented from the crossbeam 7 to the frame 15, the distance between the points of each guide 4 and the axis B parallel to the axis A progressively increases.

Furthermore, as shown in FIG. 9, the guides 4 are preferably aligned with the portion 32 parallel to the direction X.

In addition, the two guides 4 are opposite one another with respect to the portion 32 parallel to the axis B.

The assembly made up of the motor 21 and the guides 4 defines the device 50.

Furthermore, the motor 21 preferably is an electric motor.

The body 16 further comprises a tubular cavity 30 arranged coaxially to the axis A and engaged by the steering shaft 17 (FIGS. 12 and 13). More in detail, the tubular cavity 30 extends in the area of the portion 35 and of the portion 37 parallel to the axis A.

The steering shaft 17 is integral to the body 16 along the axis A when the component of a force F acting upon the steering wheel 11 parallel to the axis A is smaller than a threshold value Fθ (FIG. 12); vice versa, the steering shaft 17 can slide with respect to the body 16 along the axis A when the component of the force F acting upon the steering wheel 11 parallel to the axis A is greater than the threshold value Fθ (FIG. 13).

In detail, the steering shaft 17 is coupled with interference in the tubular cavity 30 as long as the component of the force F acting upon the steering wheel 11 parallel to the axis A is smaller than the threshold value Fθ.

More in detail, when the component of the force F acting upon the steering wheel 11 parallel to the axis A is greater than the threshold value Fθ, the component F is such as to overcome the frictions existing between the steering shaft 17 and the inner walls of the tubular cavity 30.

In the embodiment disclosed herein, the body 16 comprises a cylindrical element 41 housed in the area of the tubular cavity 30. The cylindrical element 41 comprises, in turn, a cylindrical opening 42 engaged by the cylindrical shaft 38. In detail, the extension of the tubular cavity 42 radially with respect to the axis A is smaller than the extension of the tubular cavity 30 radially with respect to the axis A.

Figures 10, 11:
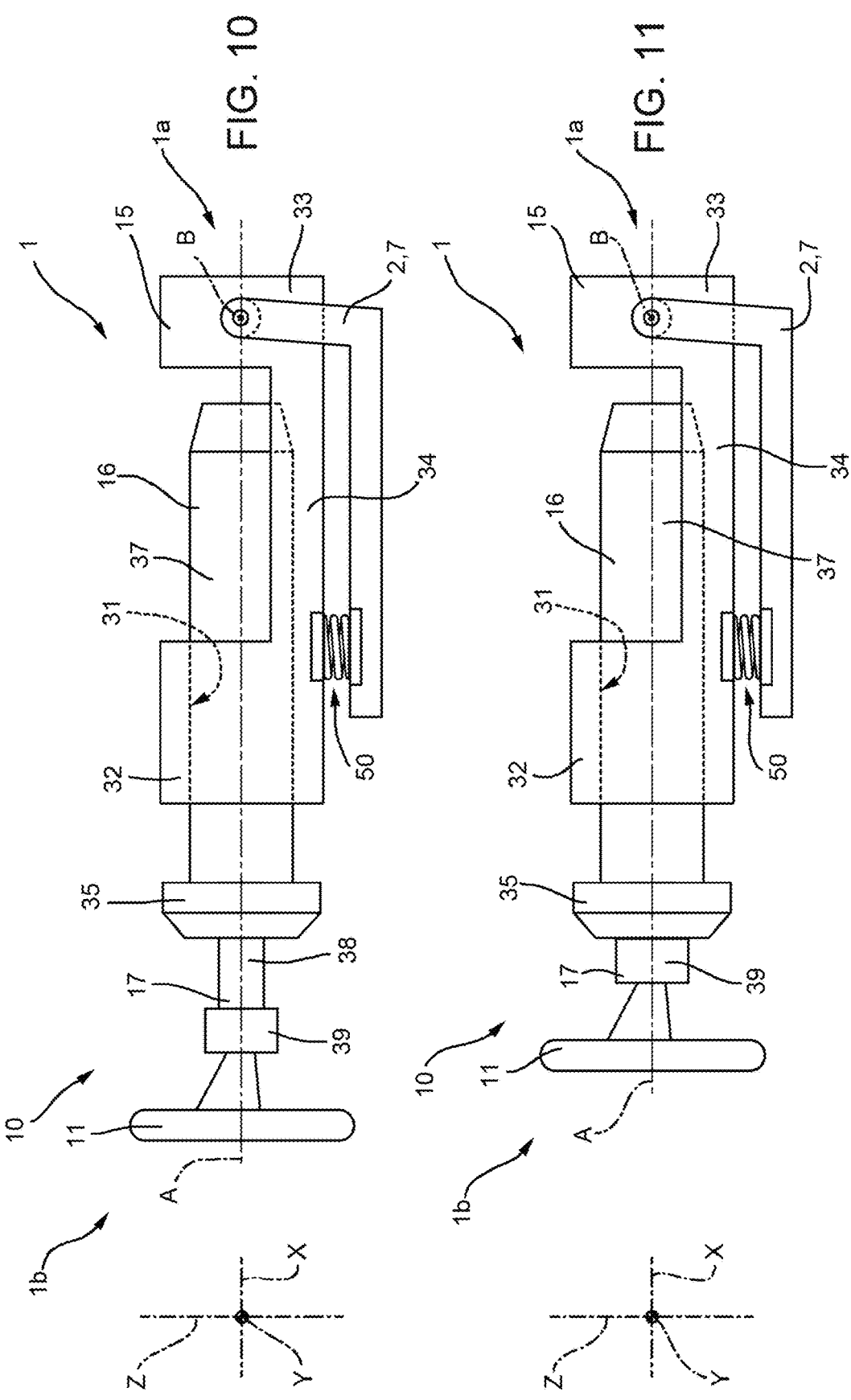
FIGS. 10 and 11 are schematic side views of the steering system shown in FIGS. 1 and 2, in respective subsequent steps of a collapse of a steering wheel of the steering system and with parts left out for greater clarity.

As shown in FIG. 11, when the component of the force F acting upon the steering wheel 11 parallel to the axis A is greater than the threshold value FO, the steering shaft 17 is adapted to slide with respect to the body 16 parallel to the axis A. In detail, the steering shaft 17 is adapted to slide with respect to the body 16 until the portion 39 strikes against the portion 35 parallel to the axis A.

The steering system 10 also comprises a motor 60 (only schematically shown in FIG. 2) operatively connected to the electronic control unit 14 and adapted to cooperate with the steering shaft 17. In detail, the electronic control unit 14 is configured to cause the motor 60 to exert, upon the steering shaft 17, a resistant torque along the axis A contrary to the action exerted by the driver upon the steering wheel 11. This resistant torque is intended to simulate the load acting upon the steering wheel in known steering systems, in which the steering wheel is mechanically connected to the wheels.

Furthermore, as shown in FIG. 1, part of the steering system 10 is housed within the volume V and part of the steering system 10 is housed outside the volume V and, therefore, is visible from the cabin 5.

Preferably, the sliding of the steering shaft 17 with respect to the frame 15 between the retracted position and the extended position parallel to the axis A is of the order of tens of millimetres (for example, 30 or 60 mm).

Furthermore, preferably, the rotation of the steering shaft 17 around the axis B between the lifted position and the lowered position is of the order of the sexagesimal degrees (for example, 3° or 6°).

In addition, preferably, the sliding of the steering shaft 17 parallel to the axis A when the component F is greater than the threshold value Fθ is of the order of tens of millimetres (for example, 80 mm).

The operation of the steering system 10 and of the motor vehicle 1 is described below.

In use, the driver rotates the steering wheel 11 around the axis A in order to control the steering of the wheels 3 around the respective steering axes. At the same time, the motor 60 exerts the resistant torque upon the steering wheel 11.

During use, the sensory system 12 detects the angular position of the steering wheel 11 around the axis A and sends to the electronic control unit 14 the informative data item relating to the detected angular position. The electronic control unit 14 controls the actuator devices 13 as a function of the informative data, so as to determine the steering of the wheels 3 in accordance with the command given by the driver through the steering wheel 11.

When the user gives a command to adjust the position of the steering wheel 11 along the axis A, the motors 18 cause the rotation of the respective gears 20 around the respective axes D. The gears 20, in turn, determine the rotation of the respective endless screws 19 around the respective axes C. Consequently, the body 16 slides parallel to the axis A with respect to the frame 15. The steering shaft 17 and the steering wheel 11 slide with respect to the frame 15, in an integral manner together with the body 16.

When the motors 18 are stopped, the coupling between the gears 20 and the respective endless screws 19 avoids an unwanted sliding of the steering wheel 11 with respect to the frame 15 along the axis A.

When the user gives a command to adjust the position of the steering wheel 11 parallel to the direction Z, the motor 21 causes the endless screw 22 to rotate around the axis E. The rotation of the endless screw 22, in turn, determines the sliding of the female screw element 23 along the axis E. Consequently, the pin 24 and the pin opposite it slide along the respective guides 4, thus determining the rotation of the frame 15 around the axis B. The steering shaft 17 and the steering wheel 11 rotate around the axis B in an integral manner together with the frame 15. In this way, the position of the steering wheel 11 parallel to the direction Z is adjusted.

When the motor 21 is stopped, the coupling between the pin 24, the pin opposite it and the respective guides 4 avoids an unwanted rotation of the frame 15 around the axis B.

In addition, when the component of the force F acting upon the steering wheel 11 parallel to the axis A is smaller than the threshold value Fθ, the steering shaft 17 is integral to the body 16 along the axis A (FIG. 12); vice versa, when the component of the force F acting upon the steering wheel 11 parallel to the axis A is greater than the threshold value Fθ (for example, in the case of a collision of the motor vehicle 1 with an obstacle or with another vehicle), the steering shaft 17 can slide with respect to the body 16 along the axis A (FIG. 13).

Owing to the above, the advantages of the steering system 10 and of the motor vehicle 1 according to the invention are evident.

Since the body 16 can slide with respect to the frame 15 parallel to the axis A and the frame 15 can rotate with respect to the crossbeam 7 around the axis B, the steering system 10 can be ergonomically and efficiently adapted to the needs of the driver.

Since the body 16 comprises the endless screws 19 and the motors 18 comprise the gears 20, which mesh with the respective endless screws 19, the sliding of the steering wheel 11 along the axis A can be controlled in an automatic and accurate manner.

Since the motor 21 comprises the endless screw 22 and the female screw element 23, which engages the respective guide 4, the movement of the steering wheel 11 parallel to the direction Z can also be controlled in an automatic and accurate manner.

In addition, since the motors 18 are integral to the frame 15, the transmission of the mechanical energy generated by said motors 18 to the body 16 can be carried out in an easy and efficient manner.

Since the steering shaft 17 is coupled with interference in the tubular cavity 30, any relative sliding between the steering shaft 17 and the body 16 is avoided as long as the force F acting parallel to the axis A is smaller than the threshold value Fθ. In this way, a simple and efficient mechanism can be obtained for the controlled collapse of the steering wheel 11, i.e. for the steering wheel 11 to be moved away from the driver in the event of a collision of the motor vehicle 1.

Since part of the steering system 10 is housed outside the volume V, the steering system 10 is partially visible from the cabin 5 and contributes to embellishing the aesthetics thereof.

Finally, the steering system 10 and the motor vehicle 1 according to the invention can be subjected to changes and variants, which, though, do not go beyond the scope of protection set forth in the appended claims.

The steering system 10 could comprise one single motor 18 instead of two motors 18. Similarly, the body 16 could comprise one single endless screw 19 instead of two endless screws 19.

The steering system 10 could comprise two motors 21 instead of one single motor 21.

The invention claimed is:

1. A steering system for a motor vehicle, said steering system comprising:
    a steering wheel rotatable about a first rotational axis;
    a sensory system adapted to detect a physical quantity associated with the angular position of said steering wheel about said first rotational axis;
    at least one actuator device adapted to rotate one or more wheels of said motor vehicle about respective steering axes;
    an electronic control unit operatively connected to said sensory system and said at least one actuator device, said electronic control unit being configured to command, in use, said at least one actuator device to rotate said wheels about the respective said steering axes on the basis of an informative datum associated with said physical quantity and received, in use, by said sensory system;
    a frame operatively connected to a portion of said motor vehicle, wherein said frame is rotatable with respect to said portion about a second rotational axis, which is transversal to said first rotational axis;
    a body supported by said frame and slidable with respect thereto parallel to said first rotational axis; and
    a steering shaft to which said steering wheel is fixed and which is supported by said body, wherein said body comprises a tubular cavity arranged coaxially to said first rotational axis and said steering shaft engages said tubular cavity,
    said steering shaft being integral with said body along said first rotational axis when a component of a force acting, in use, on said steering wheel parallel to said first rotational axis is less than a threshold value, said steering shaft being slidable with respect to said body along said first rotational axis when the component of said force acting, in use, on said steering wheel parallel to said first rotational axis is greater than said threshold value.

2. The steering system according to claim 1, wherein said steering shaft is slidable with respect to said frame integrally with said body parallel to said first rotational axis in at least some operative conditions, and wherein said steering shaft and said body are rotatable integrally with said frame about said second rotational axis.

3. The steering system according to claim 1, comprising a motor integral with said frame and adapted to cooperate with said body, said motor being adapted to determine, in use, the sliding of said body parallel to said first rotational axis with respect to said frame.

4. The steering system according to claim 3, wherein said body comprises an endless screw rotatable about a third rotational axis which is parallel to said first axis, wherein said motor comprises a gear rotatable about a fourth rotational axis which is transversal to said third axis, and wherein said endless screw and said gear mesh with each other.

5. The steering system according to claim 1, comprising a motor integral with said frame and adapted to determine, in use, the rotation of said frame with respect to said portion about said second rotational axis.

6. The steering system according to claim 1, wherein said steering shaft is press fitted into said tubular cavity when, in use, said force acting, in use, on said steering wheel parallel to said first rotational axis is less than said threshold value.

7. A motor vehicle, comprising:
    a main frame;
    a plurality of wheels rotatable relative to said main frame and steerable relative to said main frame; and
    a steering system according to claim 1.

8. The motor vehicle according to claim 7, wherein said steering system comprises a motor integral with said frame and adapted to determine, in use, the rotation of said frame with respect to said portion about said second rotational axis, wherein said motor comprises:
    an endless screw rotatable about a rotational screw axis parallel to said first rotational axis; and
    a female screw element which engages said endless screw, wherein said main frame comprises a guide, said female screw element slidably engaging said guide.

9. The motor vehicle according to claim 7, further comprising:
    a front end;
    a rear end opposite to said front end with respect to an advancement direction of said motor vehicle;
    a cabin adapted to house, in use, a driver and a passenger; and
    a dashboard which is arranged into said cabin, said dashboard comprising a surface facing said cabin and defining a volume interposed between said surface and said front end parallel to a first direction of longitudinal extension of said motor vehicle.

10. The motor vehicle according to claim 9, wherein a part of said steering system is housed within said volume and another part of said steering system is arranged outside of said volume.

11. The motor vehicle according to claim 9, further comprising a crossbeam extending along a second direction, said second direction being orthogonal to said first direction, said crossbeam being adapted to support said dashboard, wherein said frame is arranged above said crossbeam along a third direction with respect to the ground on which said wheels rest, in use, said third direction being orthogonal to said first direction and said second direction.

12. A steering system for a motor vehicle, said steering system comprising:
    a steering wheel rotatable about a steering wheel axis;
    a sensor system adapted to detect a physical quantity associated with the angular position of said steering wheel about said steering wheel axis;
    an actuator device adapted to rotate a wheel of said motor vehicle about a steering axis;
    an electronic control unit operatively connected to said sensor system and said actuator device, said electronic control unit being configured to command said actuator device to rotate said wheel about said steering axis on the basis of an informative datum associated with said physical quantity and received by said sensor system;

a frame operatively connected to said motor vehicle, wherein said frame is rotatable about a second axis which is transverse to said steering wheel axis;

a body supported by said frame; and a steering shaft to which said steering wheel is fixed, wherein said steering shaft is rigidly supported by said body along said steering wheel axis when a component of a force acting on said steering wheel along said steering wheel axis is less than a threshold value, and wherein said steering shaft is collapsible with respect to said body along said steering wheel axis when the component of said force acting on said steering wheel along said steering wheel axis is greater than said threshold value.

\* \* \* \* \*